(12) United States Patent
Ji et al.

(10) Patent No.: US 10,832,135 B2
(45) Date of Patent: Nov. 10, 2020

(54) AUTOMATIC THRESHOLDS FOR NEURAL NETWORK PRUNING AND RETRAINING

(71) Applicant: Samsung Electronics Co., Ltd., Suwon-si (KR)

(72) Inventors: Zhengping Ji, Temple City, CA (US); John Wakefield Brothers, Calistoga, CA (US); Ilia Ovsiannikov, Studio City, CA (US); Eunsoo Shim, Princeton Junction, NJ (US)

(73) Assignee: SAMSUNG ELECTRONICS CO., LTD. (KR)

( * ) Notice: Subject to any disclaimer, the term of this patent is extended or adjusted under 35 U.S.C. 154(b) by 881 days.

(21) Appl. No.: 15/488,430

(22) Filed: Apr. 14, 2017

(65) Prior Publication Data

US 2018/0232640 A1 Aug. 16, 2018

Related U.S. Application Data

(60) Provisional application No. 62/457,806, filed on Feb. 10, 2017.

(51) Int. Cl.
| | |
|---|---|
| *G06T 3/40* | (2006.01) |
| *G06N 3/08* | (2006.01) |
| *G06N 3/00* | (2006.01) |
| *A61B 5/00* | (2006.01) |
| *G06Q 50/22* | (2018.01) |

(52) U.S. Cl.
CPC .................................. *G06N 3/082* (2013.01)

(58) Field of Classification Search
CPC ...................................................... G06N 3/082

USPC ........................................................ 706/1–61
See application file for complete search history.

(56) References Cited

U.S. PATENT DOCUMENTS

| | | | | |
|---|---|---|---|---|
| 5,787,408 | A | * | 7/1998 | Deangelis ............ G06K 9/6253 706/25 |
| 6,324,532 | B1 | | 11/2001 | Spence et al. |
| 10,460,230 | B2 | * | 10/2019 | Brothers ................ G06N 3/082 |
| 2003/0069652 | A1 | * | 4/2003 | Lee ......................... G06N 5/025 700/47 |
| 2003/0149676 | A1 | * | 8/2003 | Kasabov ............... G06N 3/0436 706/2 |
| 2004/0024773 | A1 | * | 2/2004 | Stoffel ................ G06K 9/6282 |
| 2004/0215430 | A1 | * | 10/2004 | Huddleston ............ G06N 3/088 703/2 |
| 2005/0256815 | A1 | * | 11/2005 | Reeve .................... G06N 3/004 706/16 |

(Continued)

FOREIGN PATENT DOCUMENTS

WO 2016039751 A1 3/2016

OTHER PUBLICATIONS

Han et al., "Deep Compression: Compressing Deep Neural Networks With Pruning, Trained Quantization and Huffman Coding," published as a conference paper at ICLR 2016, 14 pages.

*Primary Examiner* — Brandon S Cole
(74) *Attorney, Agent, or Firm* — Renaissance IP Law Group LLP

(57) ABSTRACT

An embodiment includes a method, comprising: pruning a layer of a neural network having multiple layers using a threshold; and repeating the pruning of the layer of the neural network using a different threshold until a pruning error of the pruned layer reaches a pruning error allowance.

20 Claims, 12 Drawing Sheets

(56) References Cited

U.S. PATENT DOCUMENTS

| | | | |
|---|---|---|---|
| 2008/0172214 A1* | 7/2008 | Col | G16H 50/20 |
| | | | 703/11 |
| 2013/0138589 A1* | 5/2013 | Yu | G06N 3/08 |
| | | | 706/25 |
| 2014/0006471 A1* | 1/2014 | Margarit | G06N 3/082 |
| | | | 709/201 |
| 2015/0106316 A1 | 4/2015 | Birdwell et al. | |
| 2016/0174902 A1* | 6/2016 | Georgescu | A61B 5/7267 |
| | | | 600/408 |
| 2017/0017212 A1* | 1/2017 | Collins | G06N 3/084 |
| 2018/0232640 A1* | 8/2018 | Ji | G06N 3/082 |

* cited by examiner

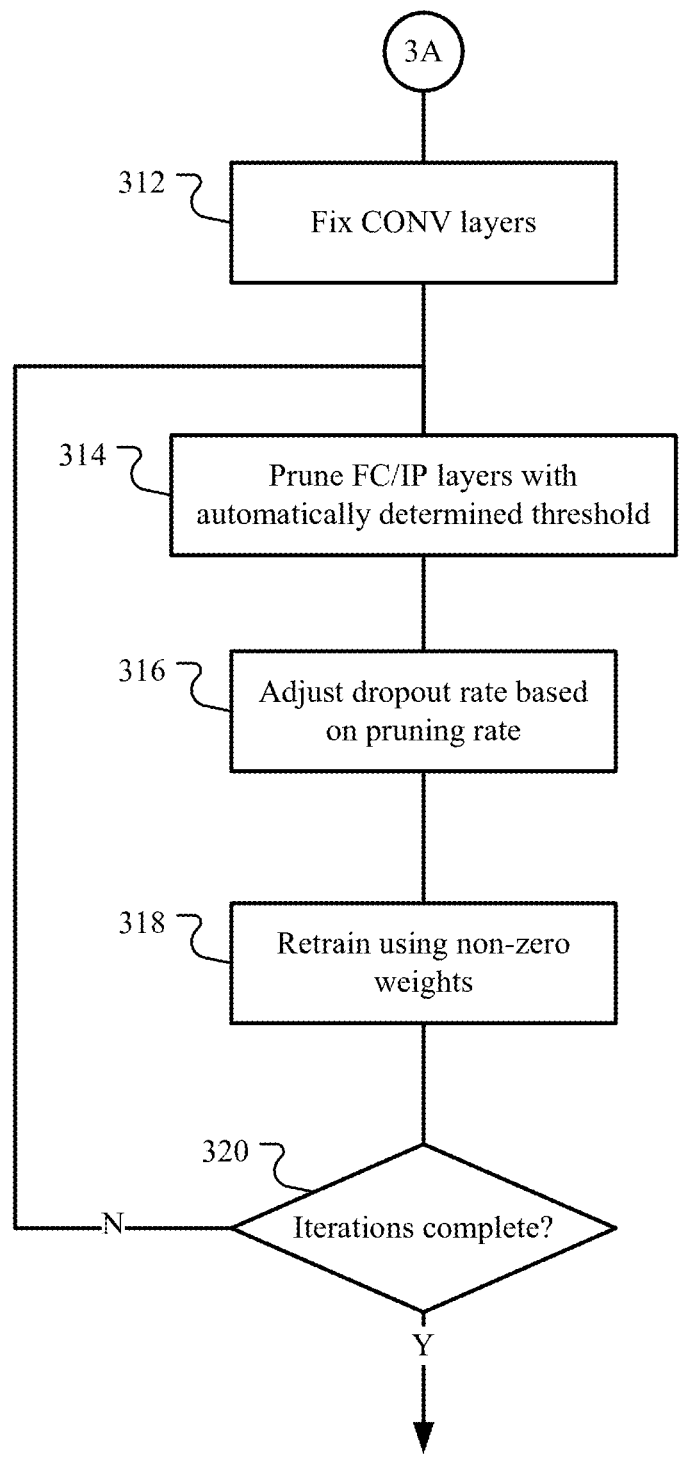

FIG. 6

| | AlexNet | Pruned AlexNet | VGG16 | Pruned VGG16 | Squeeze Net | GoogLe Net | Pruned GoogLeNet (Trainng) | Pruned GoogLeNet (Inference) |
|---|---|---|---|---|---|---|---|---|
| Size of Weight Parameters | 61M | 6.7M | 138M | 9.7M | 1.3M | 13M | 4.0M | 2.4M |
| Top1 rate | 57.22% | 57.50% | 67.74% | 67.81% | 57.50% | 68.93% | 68.89% | 68.89% |
| Top5 rate | 80.67% | 80.76% | 88.40% | 88.62% | 80.30% | 89.15% | 89.12% | 89.12% |

FIG. 7A

| LAYERS | SUB_LAYERS | DIM OF WEIGHTS | SIZE OF WEIGHTS | PREFIXED THRESHOLDS 1 | | PREFIXED THRESHOLDS 2 | | EMPIRICAL RULES | | EMBODIMENT | |
|---|---|---|---|---|---|---|---|---|---|---|---|
| | | | | Threshold (*std) | Ratio of nonzeros | Threshold (*std) | Ratio of nonzeros | Threshold (*std) | Ratio of nonzeros | Threshold (*std) | Ratio of nonzeros |
| conv1 | 7x7_s2 | (64, 3, 7, 7) | 9,408 | 0.40 | 0.4894 | 0.60 | 0.3699 | 0.40 | 0.4894 | 0.12 | 0.7861 |
| conv2 | 3x3_reduce | (64, 64, 1, 1) | 4,096 | 0.40 | 0.5842 | | 0.4365 | 0.40 | 0.5842 | 0.12 | 0.8611 |
| | 3x3 | (192, 64, 3, 3) | 110,592 | | 0.4609 | 0.60 | 0.3410 | 0.60 | 0.4609 | 0.44 | 0.5812 |
| inception_3a | 1x1 | (64, 192, 1, 1) | 12,288 | | 0.3869 | | 0.2786 | 0.50 | 0.4591 | 0.24 | 0.7048 |
| | 3x3_reduce | (96, 192, 1, 1) | 18,432 | | 0.4232 | | 0.3062 | 0.50 | 0.4989 | 0.28 | 0.7005 |
| | 3x3 | (128, 96, 3, 3) | 110,592 | 0.60 | 0.4706 | 0.80 | 0.3467 | 0.70 | 0.4050 | 0.58 | 0.4855 |
| | 5x5_reduce | (16, 192, 1, 1) | 3,072 | | 0.3750 | | 0.2601 | 0.50 | 0.4453 | 0.28 | 0.6732 |
| | 5x5 | (32, 16, 5, 5) | 12,800 | | 0.3505 | | 0.2564 | 0.60 | 0.3505 | 0.46 | 0.4505 |
| | pool_proj | (32, 192, 1, 1) | 6,144 | | 0.4551 | | 0.3416 | 0.50 | 0.5218 | 0.24 | 0.7534 |
| inception_3b | 1x1 | (128, 256, 1, 1) | 32,768 | | 0.4413 | | 0.3154 | 0.60 | 0.4413 | 0.38 | 0.6188 |
| | 3x3_reduce | (128, 256, 1, 1) | 32,768 | | 0.4830 | | 0.3539 | 0.60 | 0.4830 | 0.34 | 0.6915 |
| | 3x3 | (192, 128, 3, 3) | 221,184 | 0.60 | 0.5215 | 0.80 | 0.3932 | 0.70 | 0.4551 | 0.64 | 0.4949 |
| | 5x5_reduce | (32, 256, 1, 1) | 8,192 | | 0.4012 | | 0.2904 | 0.50 | 0.4744 | 0.32 | 0.6353 |
| | 5x5 | (96, 32, 5, 5) | 76,800 | | 0.4896 | | 0.3632 | 0.70 | 0.4241 | 0.62 | 0.4759 |
| | pool_proj | (64, 256, 1, 1) | 16,384 | | 0.4861 | | 0.3606 | 0.50 | 0.5599 | 0.36 | 0.6724 |
| inception_4a | 1x1 | (192, 480, 1, 1) | 92,160 | | 0.4830 | | 0.3563 | 0.60 | 0.4830 | 0.48 | 0.5732 |
| | 3x3_reduce | (96, 480, 1, 1) | 46,080 | | 0.4684 | | 0.3447 | 0.60 | 0.4684 | 0.42 | 0.6081 |
| | 3x3 | (208, 96, 3, 3) | 179,712 | 0.60 | 0.5016 | 0.80 | 0.3751 | 0.80 | 0.3751 | 0.62 | 0.4872 |
| | 5x5_reduce | (16, 480, 1, 1) | 7,680 | | 0.4503 | | 0.3260 | 0.50 | 0.5241 | 0.50 | 0.5241 |
| | 5x5 | (48, 16, 5, 5) | 19,200 | | 0.4674 | | 0.3490 | 0.70 | 0.4042 | 0.58 | 0.4816 |
| | pool_proj | (64, 480, 1, 1) | 30,720 | | 0.5048 | | 0.3805 | 0.50 | 0.5767 | 0.46 | 0.6066 |
| loss1 | conv | (128, 512, 1, 1) | 65,536 | | 0.2254 | | 0.1611 | 0.70 | 0.4214 | 0.60 | 0.4893 |
| | fc | (1024, 2048) | 2,097,152 | 1.10 | 0.2667 | 1.20 | 0.1905 | 1.20 | 0.2262 | 1.20 | 0.2262 |
| | classifier | (1000, 1024) | 1,024,000 | | 0.3168 | | 0.2102 | 1.20 | 0.2612 | 1.20 | 0.2612 |

FIG. 7B

| LAYERS | SUB_LAYERS | DIM OF WEIGHTS | SIZE OF WEIGHTS | PREFIXED THRESHOLDS 1 Threshold (*std) | Ratio of nonzeros | PREFIXED THRESHOLDS 2 Threshold (*std) | Ratio of nonzeros | EMPIRICAL RULES Threshold (*std) | Ratio of nonzeros | EMBODIMENT Threshold (*std) | Ratio of nonzeros |
|---|---|---|---|---|---|---|---|---|---|---|---|
| inception_4b | 1x1 | (160, 512, 1, 1) | 81,920 | | 0.4428 | | 0.3182 | 0.60 | 0.4428 | 0.56 | 0.4699 |
| | 3x3_reduce | (112, 512, 1, 1) | 57,344 | | 0.4373 | | 0.3098 | 0.60 | 0.4373 | 0.56 | 0.4659 |
| | 3x3 | (224, 112, 3, 3) | 225,792 | 0.60 | 0.5054 | 0.80 | 0.3768 | 0.80 | 0.3768 | 0.86 | 0.3429 |
| | 5x5_reduce | (24, 512, 1, 1) | 12,288 | | 0.4337 | | 0.3136 | 0.50 | 0.5103 | 0.48 | 0.5256 |
| | 5x5 | (64, 24, 5, 5) | 38,400 | | 0.4999 | | 0.3749 | 0.70 | 0.4338 | 0.62 | 0.4870 |
| | pool_proj | (64, 512, 1, 1) | 32,768 | | 0.4998 | | 0.3713 | 0.50 | 0.5721 | 0.52 | 0.5587 |
| | 1x1 | (128, 512, 1, 1) | 65,536 | | 0.4667 | | 0.3392 | 0.60 | 0.4667 | 0.48 | 0.5539 |
| | 3x3_reduce | (128, 512, 1, 1) | 65,536 | | 0.4814 | | 0.3512 | 0.60 | 0.4814 | 0.52 | 0.5420 |
| inception_4c | 3x3 | (256, 128, 3, 3) | 294,912 | 0.60 | 0.5103 | 0.80 | 0.3823 | 0.80 | 0.3823 | 0.88 | 0.3375 |
| | 5x5_reduce | (24, 512, 1, 1) | 12,288 | | 0.4569 | | 0.3303 | 0.50 | 0.5338 | 0.44 | 0.5827 |
| | 5x5 | (64, 24, 5, 5) | 38,400 | | 0.4718 | | 0.3477 | 0.70 | 0.4062 | 0.62 | 0.4577 |
| | pool_proj | (64, 512, 1, 1) | 32,768 | | 0.4972 | | 0.3733 | 0.60 | 0.4972 | 0.60 | 0.4972 |
| | 1x1 | (112, 512, 1, 1) | 57,344 | | 0.4766 | | 0.3523 | 0.60 | 0.4766 | 0.52 | 0.5350 |
| | 3x3_reduce | (144, 512, 1, 1) | 73,728 | | 0.5057 | | 0.3767 | 0.60 | 0.5057 | 0.46 | 0.6104 |
| inception_4d | 3x3 | (288, 144, 3, 3) | 373,248 | 0.60 | 0.5203 | 0.80 | 0.3899 | 0.80 | 0.3899 | 0.86 | 0.3553 |
| | 5x5_reduce | (32, 512, 1, 1) | 16,384 | | 0.4804 | | 0.3518 | 0.50 | 0.5522 | 0.52 | 0.5383 |
| | 5x5 | (64, 32, 5, 5) | 51,200 | | 0.5041 | | 0.3788 | 0.70 | 0.4394 | 0.72 | 0.4267 |
| | pool_proj | (64, 512, 1, 1) | 32,768 | | 0.4918 | | 0.3636 | 0.60 | 0.4918 | 0.56 | 0.5204 |
| | conv | (128, 528, 1, 1) | 67,584 | | 0.2478 | | 0.1763 | 0.60 | 0.5192 | 0.60 | 0.5192 |
| loss2 | fc | (1024, 2048) | 2,097,152 | 1.10 | 0.2704 | 1.20 | 0.1930 | 1.20 | 0.2295 | 1.20 | 0.2295 |
| | classifier | (1000, 1024) | 1,024,000 | | 0.3205 | | 0.2102 | 1.20 | 0.2627 | 1.20 | 0.2627 |

FIG. 7C

| LAYERS | SUB_LAYERS | DIM OF WEIGHTS | SIZE OF WEIGHTS | PREFIXED THRESHOLDS 1 Threshold (*std) | Ratio of nonzeros | PREFIXED THRESHOLDS 2 Threshold (*std) | Ratio of nonzeros | EMPIRICAL RULES Threshold (*std) | Ratio of nonzeros | EMBODIMENT Threshold (*std) | Ratio of nonzeros |
|---|---|---|---|---|---|---|---|---|---|---|---|
| inception_4e | 1x1 | (256, 528, 1, 1) | 135,168 | | 0.4487 | | 0.3155 | 0.70 | 0.3775 | 0.60 | 0.4487 |
| | 3x3_reduce | (160, 528, 1, 1) | 84,480 | | 0.4943 | | 0.3629 | 0.70 | 0.4252 | 0.64 | 0.4654 |
| | 3x3 | (320, 160, 3, 3) | 460,800 | | 0.4667 | | 0.3408 | 1.20 | 0.1707 | 1.48 | 0.1037 |
| | 5x5_reduce | (32, 528, 1, 1) | 16,896 | 0.60 | 0.4694 | 0.80 | 0.3408 | 0.60 | 0.4694 | 0.56 | 0.4998 |
| | 5x5 | (128, 32, 5, 5) | 102,400 | | 0.5194 | | 0.3882 | 1.20 | 0.1971 | 1.06 | 0.2532 |
| | pool_proj | (128, 528, 1, 1) | 67,584 | | 0.4910 | | 0.3606 | 0.60 | 0.4910 | 0.62 | 0.4766 |
| | 1x1 | (256, 832, 1, 1) | 212,992 | | 0.4788 | | 0.3537 | 0.70 | 0.4136 | 0.64 | 0.4521 |
| | 3x3_reduce | (160, 832, 1, 1) | 133,120 | | 0.4952 | | 0.3691 | 0.70 | 0.4290 | 0.70 | 0.4290 |
| inception_5a | 3x3 | (320, 160, 3, 3) | 460,800 | 0.60 | 0.5291 | 0.80 | 0.4001 | 1.40 | 0.1433 | 1.32 | 0.1665 |
| | 5x5_reduce | (32, 832, 1, 1) | 26,624 | | 0.4766 | | 0.3554 | 0.60 | 0.4766 | 0.62 | 0.4638 |
| | 5x5 | (128, 32, 5, 5) | 102,400 | | 0.5119 | | 0.3823 | 1.40 | 0.1394 | 0.90 | 0.3272 |
| | pool_proj | (128, 832, 1, 1) | 106,496 | | 0.5028 | | 0.3795 | 0.60 | 0.5028 | 0.62 | 0.4898 |
| | 1x1 | (384, 832, 1, 1) | 319,488 | | 0.5242 | | 0.3971 | 0.80 | 0.3971 | 0.64 | 0.4976 |
| | 3x3_reduce | (192, 832, 1, 1) | 159,744 | | 0.5261 | | 0.3986 | 0.60 | 0.5261 | 0.62 | 0.5126 |
| inception_5b | 3x3 | (384, 192, 3, 3) | 663,552 | 0.60 | 0.5449 | 0.80 | 0.4158 | 1.60 | 0.0996 | 1.48 | 0.1268 |
| | 5x5_reduce | (48, 832, 1, 1) | 39,936 | | 0.5309 | | 0.4045 | 0.60 | 0.5309 | 0.62 | 0.5170 |
| | 5x5 | (128, 48, 5, 5) | 153,600 | | 0.5115 | | 0.3845 | 1.60 | 0.0970 | 1.28 | 0.1731 |
| | pool_proj | (128, 832, 1, 1) | 106,496 | | 0.5286 | | 0.4023 | 0.80 | 0.4023 | 0.76 | 0.4259 |
| loss3 | classifier | (1000, 1024) | 1,024,000 | 1.10 | 0.2827 | 1.20 | 0.1984 | 1.20 | 0.2380 | 1.20 | 0.2380 |
| Total pruning rate | Training | | | | 0.3815 | | 0.2768 | | 0.2842 | | 0.2982 |
| | Inference | | | | 0.4704 | | 0.3493 | | 0.3210 | | 0.3472 |
| Total weights | Training | | 13,365,696 | | 5,098,593 | | 3,699,343 | | 3,798,508 | | 3,985,873 |
| | Inference | | 6,990,272 | | 3,288,059 | | 2,441,938 | | 2,243,779 | | 2,426,695 |
| Recognition performance | top-1 rate | | 68.93% | | 68.67% | | 67.70% | | 67.46% | | 68.70% |
| | top-5 rate | | 89.15% | | 88.88% | | 88.43% | | 88.31% | | 89.06% |

AUTOMATIC THRESHOLDS FOR NEURAL NETWORK PRUNING AND RETRAINING

CROSS-REFERENCE TO RELATED APPLICATIONS

This application claims the benefit of U.S. Provisional Patent Application No. 62/457,806, filed Feb. 10, 2017, the contents of which is hereby incorporated by reference herein, in its entirety, for all purposes.

BACKGROUND

This disclosure relates to pruning and retraining of neural networks and, in particular, pruning and retraining of neural networks using automatic thresholds.

Deep learning architectures, especially convolutional deep neural networks have been used in artificial intelligence (AI) and computer vision fields. These architectures have been shown to produce results on tasks including visual object recognition, detection and segmentation. However, such architectures may have a large number of parameters, resulting high computational loads and increased power consumption.

SUMMARY

An embodiment includes a method, comprising: pruning a layer of a neural network having multiple layers using a threshold; and repeating the pruning of the layer of the neural network using a different threshold until a pruning error of the pruned layer reaches a pruning error allowance.

An embodiment includes a method, comprising: repeating: pruning a plurality of layers of a neural network using automatically determined thresholds; and retraining the neural network using only weights remaining after pruning.

An embodiment includes a system, comprising: a memory; and a processor coupled to the memory and configured to: prune a layer of a neural network having multiple layers using a threshold; and repeat the pruning of the layer of the neural network using a different threshold until a pruning error of the pruned layer reaches a pruning error allowance.

BRIEF DESCRIPTION OF SEVERAL VIEWS OF THE DRAWINGS

FIGS. 3A-B are a flowchart of a retraining operation according to some embodiments.

FIG. 6 is a chart including results of various neural networks after pruning and retraining according to some embodiments.

FIGS. 7A-C are a chart including results of various techniques of pruning neural networks according to some embodiments.

DETAILED DESCRIPTION

Figure 1A:
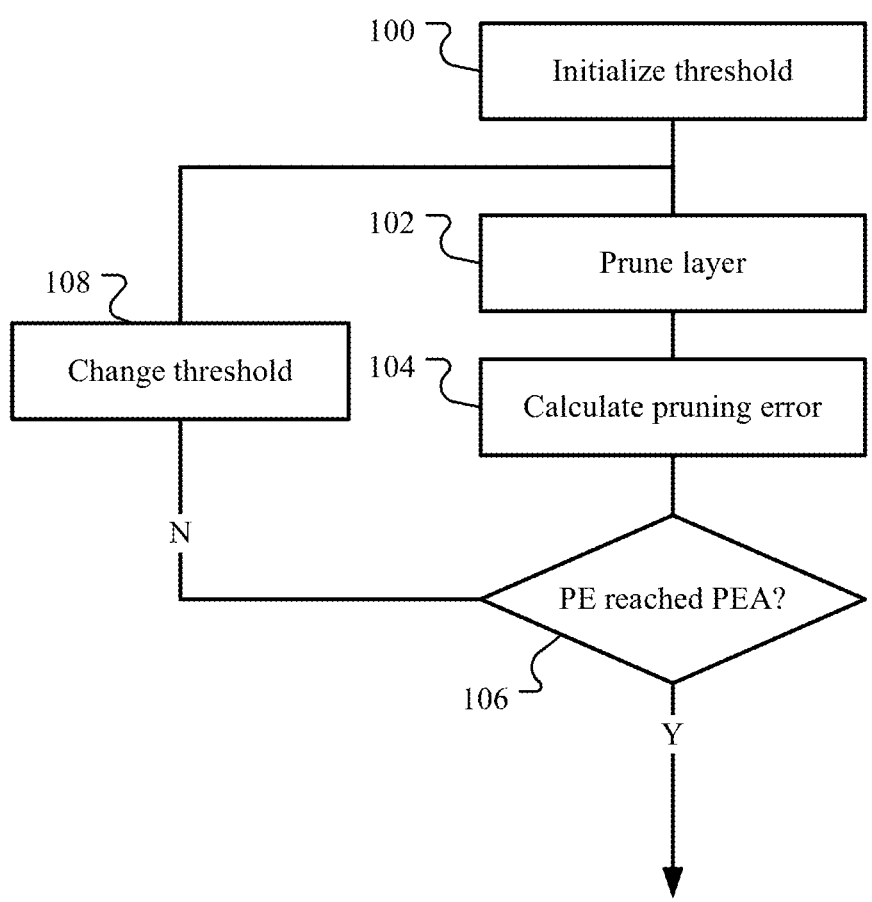
FIGS. 1A-B are flowcharts of techniques for automatically determining a threshold according to some embodiments.

The embodiments relate to pruning and retraining of neural networks and, in particular, pruning and retraining of neural networks using automatic thresholds. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods, devices, and systems provided in particular implementations.

However, the methods, devices, and systems will operate effectively in other implementations. Phrases such as "an embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain operations. However, the methods and systems may operate according to other methods having different and/or additional operations and operations in different orders and/or in parallel that are not inconsistent with the embodiments. Thus, embodiments are not intended to be limited to the particular embodiments shown, but are to be accorded the widest scope consistent with the principles and features described herein.

The embodiments are described in the context of particular systems or devices having certain components. One of ordinary skill in the art will readily recognize that embodiments are consistent with the use of systems or devices having other and/or additional components and/or other features. Methods, device, and systems may also be described in the context of single elements. However, one of ordinary skill in the art will readily recognize that the methods and systems are consistent with the use of architectures having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In some embodiments, neural networks, such as deep learning neural networks, may be created with reduced parameter size. As a result, a level of performance for image recognition task may be maintained while reducing the load on neural network hardware. In some embodiments, to reduce the parameter size of neural networks, the neural networks may be pruned so as to make many of parameters to be zero. However, a problem arises in how to set a good threshold for each layer of neural networks to prune the networks as much as possible but in the meanwhile maintaining original performance. For neural networks composed of dozens of layers, a brute force searching for a threshold may not be practical, especially considering that the threshold for one layer might be dependent on others. In addition, the pruning may require the retraining of the network to recover to the original performance. This pruning process may take considerable time to be verified as being effective. As described herein, in various embodiments, an automatic selection of thresholds along with methods to retrain the network may be used to prune neural network to reduce parameters.

FIG. 1A is a flowchart of a technique for automatically determining a threshold according to some embodiments. In 100, a threshold for pruning a layer of a neural network is initialized. In some embodiments, the threshold may be initialized to an extreme end of a range of values, such as 0 or 1. In other embodiments, the threshold may be initialized to a specific value such as 0.2, 0.5, or the like. In other embodiments, the threshold may be set to a random value. In other embodiments, the threshold may be determined using empirical rules. In some embodiments, the threshold may be set to a value that was automatically determined for another layer, such as a similarly situated layer or a layer that is a similar or of a same type. In some embodiments, the initial threshold may be the same for all layers of the neural network; however, in other embodiments, the threshold may be different for some or each of the layers.

In 102, the layer of the neural network is pruned using the threshold. For example, the threshold is used to set some weights of the layer to be zero. In 104, the pruning error is calculated for the pruned layer. The pruning error is a function of the weights before and after pruning.

In 106, the pruning error (PE) is compared with the pruning error allowance (PEA). In some embodiments, the pruning error may have reached the pruning error allowance if the pruning error is equal to the pruning error allowance. However, in other embodiments, the pruning error may have reached the pruning error allowance if it is within a range including the pruning error allowance. Alternatively, the pruning error allowance may be a range of acceptable pruning errors. For example, a relatively small number may be used to define a range above and below a particular pruning error allowance. If the magnitude of the separation of the pruning error and the pruning error allowance is less than the relatively small number, the pruning error is considered to be at the pruning error allowance.

If the pruning error has not reached the pruning error allowance, the threshold is changed in 108. Changing the threshold may be performed in a variety of ways. For example, the threshold may be changed by a fixed amount. In other embodiments, the threshold may be changed by an amount based on the difference of the pruning error and the pruning error allowance. In other embodiments, the threshold may be changed by an amount based on the current threshold. In other embodiments, a search technique, such as a binary search or other types of searches, may be used to select another threshold. The technique to change the threshold may, but need not be the same technique for all layers.

Regardless of how changed, after the threshold is changed in 108, the process repeats by pruning the layer in 102 and calculating the pruning error in 104. The pruning error is compared again to the pruning error allowance to determine of the pruning error has reached the pruning error allowance. Accordingly, the pruning of the layer of the neural network is repeated using different thresholds until the pruning error reaches the pruning error allowance.

Figure 1B:
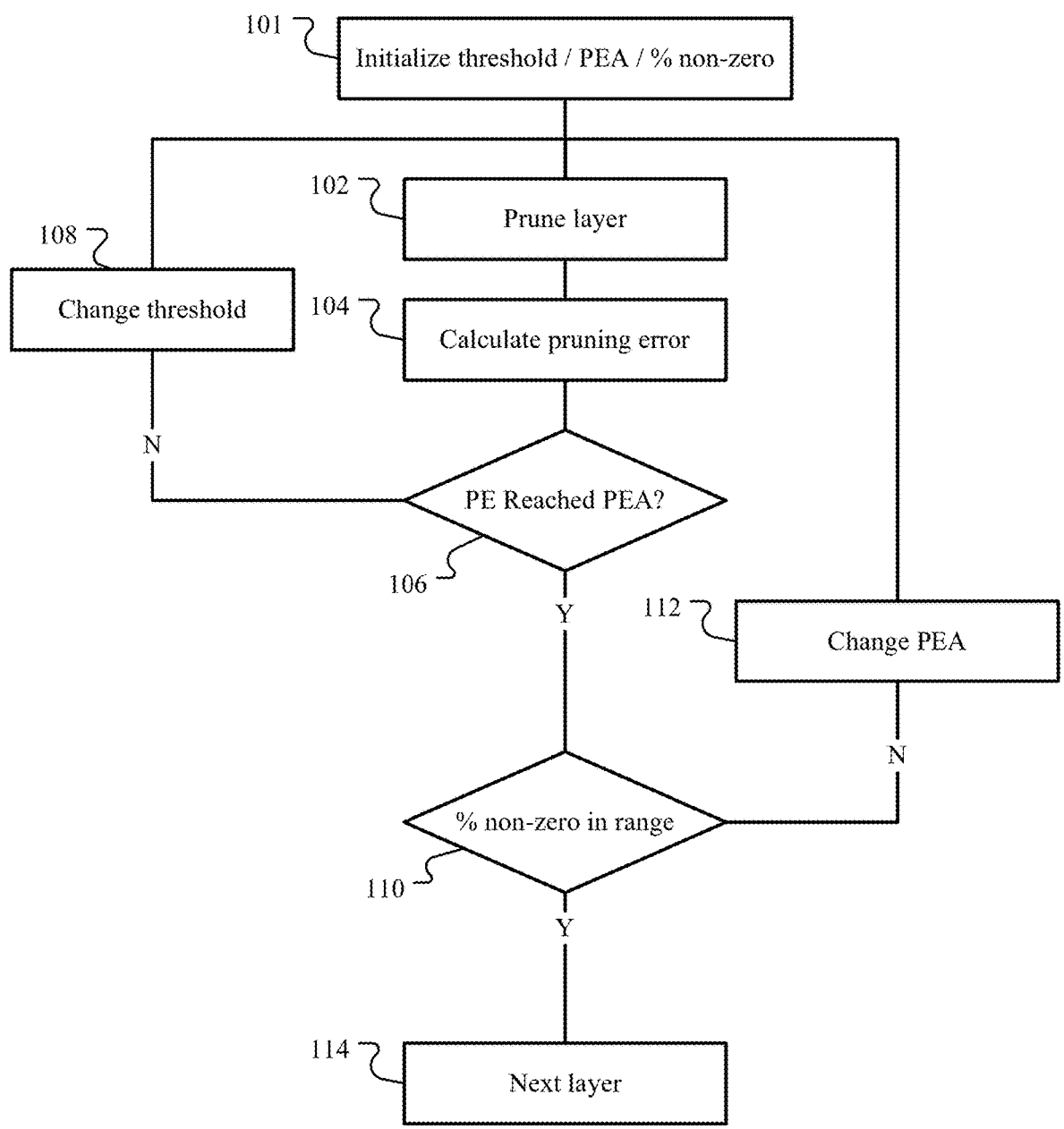

FIG. 1B is a flowchart of a technique for automatically determining a threshold according to some embodiments. In this embodiment, the pruning technique is similar to that of FIG. 1A. The description of similar operations will be omitted. In some embodiments, in 101, the pruning error allowance is initialized in 101. In other embodiments, a percentage or range of percentages of non-zero weights may be initialized. In other embodiments, combinations of the threshold, pruning error allowance, and the percentage or range of percentages of non-zero weights may be initialized. The pruning error allowance and/or the percentage or range of percentages of non-zero weights may be initialized using techniques similar to those described above for initializing the threshold.

In 110, after the pruning error has reached the pruning error allowance, the percentage of non-zero weights is calculated and compared to the acceptable percentage or range of percentages of non-zero weights. In this embodiment, the number of pruned weights is represented as a percentage; however, in other embodiments, the number of pruned weights may be represented differently. While a percentage of non-zero weights has been used as an example, in other embodiments, the percentage of pruned weights may be used and compared to a corresponding range or value.

If the percentage of pruned weights is not within a range for the layer, in 112, the pruning error allowance is changed. The pruning error allowance may be changed using techniques described above with respect to changing the threshold in 108. The same or different technique used to change the threshold may also be used to change the pruning error allowance. The technique to change the pruning error allowance may, but need not be the same technique for all layers.

After the pruning error allowance has been changed, the layer may be pruned again in 102. The subsequent operations may be performed until the percentage of pruned weights is within the range of an acceptable amount. In 114, the next layer may be processed similarly. Accordingly, the process may repeat for each layer of the neural network.

Using a technique according to some embodiments allows for a single threshold and/or a single pruning error allowance to prune all layers of a neural network. However, each layer will eventually have an automatically determined threshold that is based on the particular layer. If a fixed threshold is used for two to all layers, the threshold may not be optimal for one or more of those layers. In addition, as the pruning technique according to some embodiments is focused on individual layers, the threshold may be determined specifically for that layer.

In some embodiments, the percentage of non-zero weights may be a single control or single type of control used to prune the neural network. As described above, the pruning error allowance will be changed until the percentage of non-zero weights is within the desired range. Similarly, the threshold is changed until the pruning error has reached the pruning error allowance. Thus, by setting the percentage of non-zero weights, the pruning error allowance and the threshold will be changed to reach the desired percentage.

In some embodiments, the pruning error allowance and/or the threshold may also be initialized. For example, the pruning error allowance may be initialized to bias the result of the operations to a particular side of a range of percentage of non-zero weights or to a particular position within that range.

In some embodiments, the threshold may be determined as follows. A pruning error allowance $\varepsilon^*$ is initialized. For each layer l, a threshold $T_l$ is initialized using a technique described above. Using the threshold $T_l$, each weight $w_i$ of the layer l is pruned. Equation 1 is an example of how the weights may be pruned.

$$w_i = \begin{cases} 0, & \text{if } |w_i| < T_l \sigma(w) \\ w_i, & \text{else} \end{cases} \quad (1)$$

In some embodiments, the threshold $T_l$ may be scaled by a scale factor. Here, the threshold $T_l$ is scaled by $\sigma(w)$. $\sigma(w)$ is the standard deviation of all the weights within the layer. However, in other embodiments, the threshold $T_l$ may be scaled by a different scale factor.

Once the layer is pruned, the pruning error $\varepsilon$ is calculated. Equation 2 is an example of how the pruning error is calculated.

$$\varepsilon = \frac{\|w_{pruned} - w\|_1}{D(w) - \|w_{pruned}\|_0} \quad (2)$$

Here, $w_{pruned}$ is the vector of pruned weights and w is the vector of original weights before pruning. D(w) is the total length of w. Accordingly, the resulting pruning error $\varepsilon$ is based on the amount of the error and the number of weights pruned.

The pruning error $\varepsilon$ may be compared with pruning error allowance $\varepsilon^*$. Equation 3 is an example of the comparison.

$$|\varepsilon - \varepsilon^*| > \theta \quad (3)$$

Here, $\theta$ is a number defining the range centered on the pruning error allowance $\varepsilon^*$. In some embodiments, $\theta$ is 0; however, in other embodiments, $\theta$ is a relatively small number. In other embodiments, $\theta$ is a number that defines the size of the range.

If the pruning error $\varepsilon$ is less than $\theta$ from the pruning error allowance $\varepsilon^*$, the pruning error $\varepsilon$ has reached the pruning error allowance $\varepsilon^*$. If not, the threshold $T_l$ may be changed as described in equation 4.

$$T_l = \begin{cases} T_l + \zeta, & \text{if } \varepsilon > \varepsilon^* + \theta \\ T_l - \zeta, & \text{if } \varepsilon < \varepsilon^* - \theta \end{cases} \quad (4)$$

Here, $\zeta$ is a constant by which the threshold $T_l$ may be changed. As described above, in other embodiments, the threshold $T_l$ may be changed in a different manner. For example, $\zeta$ may be a value that is progressively reduced by a factor of 2 for each iteration. Regardless, once the threshold $T_l$ may is changed, the pruning using the updated threshold $T_l$ and subsequent steps may be performed as described above.

If the pruning error $\varepsilon$ has reached the pruning error allowance $\varepsilon^*$, the percentage of non-zero weights may be checked. Equation 5 is an example of calculating the percentage p.

$$p = \frac{\|w_{pruned}\|_0}{D(w)} \quad (5)$$

The percentage p is then compared to a range of acceptable percentages. In some embodiments, the range of acceptable percentages may be the same; however, in other embodiments, the ranges may be different. In particular, the range may depend on the type of the layer. For example, for convolution-type layers, the range for the percentage p may be between 0.2 and 0.9 while for other layers, such as fully connected layers, the range may be between 0.04 and 0.2.

If the percentage p is less than the lower end of the range for the layer, the pruning error allowance $\varepsilon^*$ is decreased as in equation 6. Similarly, if the percentage p is greater than the higher end of the range for the layer, the pruning error allowance $\varepsilon^*$ is increased as in equation 7.

$$\varepsilon = \varepsilon - \tau \quad (6)$$

$$\varepsilon = \varepsilon + \tau \quad (7)$$

After the error allowance $\varepsilon^*$ is changed, the pruning described above may be repeated until the pruning error $\varepsilon$ has reached the new pruning error allowance $\varepsilon^*$. In some embodiments, the threshold $T_l$ may be retained from a previous iteration; however, in other embodiments, the threshold $T_l$ may be different, such as being initialized to the original initial value or initialized according to an initialization algorithm. For example, the threshold $T_l$ for the next iteration may be initialized to a value based on the past threshold $T_l$, but adjusted in a direction expected to reduce a number of pruning iterations to reach the new pruning error allowance $\varepsilon^*$.

The techniques described above may repeat until the percentage p is within the acceptable range for the layer. The operations may be repeated for the other layers of the neural network. In some embodiments, the various values such as the pruning error allowance $\varepsilon^*$ and the initial threshold $T_l$ may be selected with or without depending on a previously pruned layer. For example, for two similarly situated layers, a later pruned layer may use the resulting pruning error allowance $\varepsilon^*$ and the threshold $T_l$ from the earlier pruned layer.

Accordingly, by pruning according to techniques described herein, in some embodiments, the pruning threshold for each layer may be automatically determined. That is, the threshold may be determined to satisfy a particular range of remaining non-zero weights and/or a particular pruning error allowance for the pruned layer. The threshold may be different for one or more layers, including for all layers, depending on the particular layer.

Figure 2:
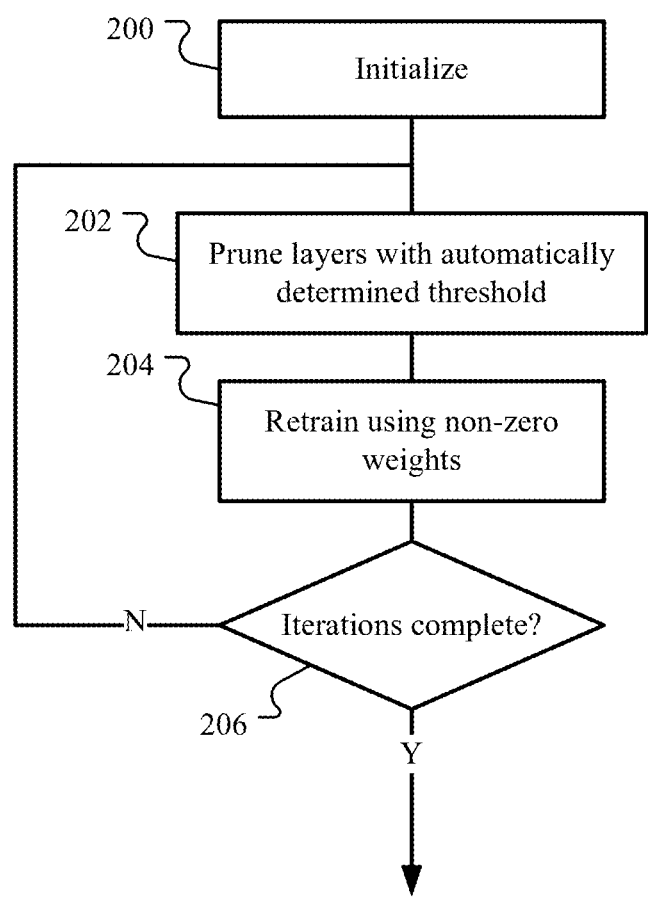
FIG. 2 is a flowchart of a retraining operation according to some embodiments.

FIG. 2 is a flowchart of a retraining operation according to some embodiments. In 200, various parameters may be initialized. For example, the base learning rate, counters for the number of iterations, or the like may be initialized.

In 202, layers of a neural network are pruned using automatically determined thresholds. In particular, the thresholds for the layers may be automatically generated as described above. In some embodiments, all of the layers may be pruned; however, as will be described in further detail below, in some embodiments, less than all of the layers may be pruned.

As a result of the pruning, a neural network with non-zero weights remains. In 204, the neural network is retrained using those non-zero weights. The operations of pruning and retraining are repeated until a desired number of iterations have been completed. For example, in 206, the number of iterations may be compared against a desired number. If the number of iterations has not reached the desired number, the pruning and retraining may be repeated.

Figure 3A:
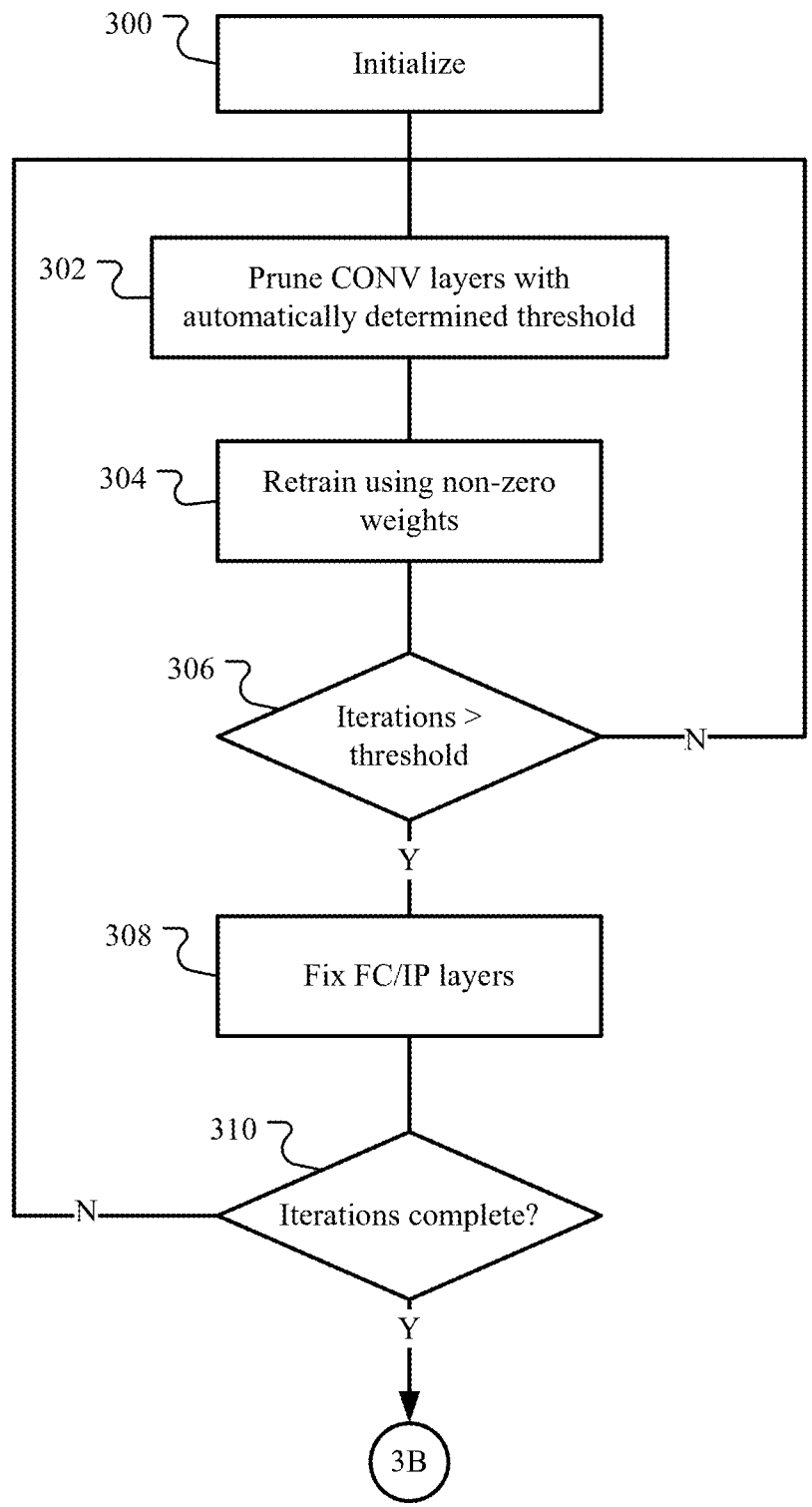

FIGS. 3A-B is a flowchart of a retraining operation according to some embodiments. Referring to FIG. 3A, in 300, various parameters may be initialized similar to those in 200 described above. In 302, convolution-type (CONV) layers are pruned using the automatically determined thresholds for those layers. Although convolution-type layers have been used as an example, in other embodiments, a different type or other subset containing less than all of the layers may be pruned.

In 304, the neural network is retrained using the non-zero weights. In some embodiments, the retraining continues for a particular number of iterations. In other embodiments, the retraining continues until the retraining has covered all of a set of training samples.

In 306, the number of iterations is compared with a threshold. If the number of iterations is less than the threshold, the pruning and retraining in 302 and 304 are repeated. In particular, after the retraining in 304, when the pruning in 302 is performed, some of the non-zero weights that previously survived an earlier pruning operation may have fallen below the pruning threshold for the associated layer. Accordingly, those weights may be set to zero and the remaining non-zero weights are retrained in 304.

If the number of iterations has reached the threshold in 306, in 308 a set of layers of the neural network that have a type different from those being pruned in 302 are fixed. That is, the fixed layers are not retrained during a subsequent retraining in 304. In some embodiments, the fully connected (FC) and input (IP) layers are fixed. The pruning in 302 and retraining in 304 may be repeated until a desired number of iterations are completed in 310.

Referring to FIG. 3B, in 312, the layers that were being pruned in 302 of FIG. 3A are fixed. In this example, the convolution-type layers were the layers being pruned in 302. Thus, the convolution-type layers are fixed in 312.

In 314, the layers that were fixed in 308 are pruned using the automatically determined thresholds associated with the layers. In this example, the layers are the FC/IP layers as those were the layers fixed in 308.

In 316, the dropout rate for retraining may be adjusted based on the pruning rate. In particular, as the pruning rate may reflect the reduced number of weights, the dropout rate may be correspondingly changed to accommodate the lower number of non-zero weights.

In 318, the neural network is retrained. However, the convolution type layers were fixed in 321. Thus, those layers are not retrained. In 320, if a number of iterations have not been completed, the pruning and retraining in 314 and 318 are repeated.

In some embodiments, other than the initialization in 300 of FIG. 3A, the remainder of the operations in FIG. 3A may not be performed. That is, the operations may begin at 312 where the convolution-type layers are fixed. In some embodiments, the convolution-type layers may be pruned using the respective automatically determined thresholds before fixing the layers.

Although particular types of layers have been used as examples of those that are pruned, retrained, and fixed, in other embodiments, the types may be different. In addition, in some embodiments, the first set of layers that are pruned in 302 and fixed in 312 and the second set of layers that are fixed in 308 and pruned in 314 may form the entire set of layers. However, in other embodiments, pruning, retraining, and fixing of other sets of layers may not follow the technique used for the first or second sets. For example, a third set of layers may be pruned in 302 but not fixed in 312.

Figure 4:
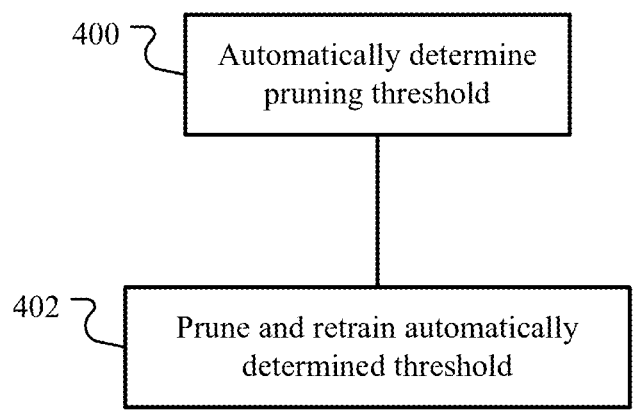
FIG. 4 is a flowchart of a technique of automatically determining a threshold, pruning, and retraining according to some embodiments.

FIG. 4 is a flowchart of a technique of automatically determining a threshold, pruning, and retraining according to some embodiments. In some embodiments, in 400 pruning thresholds are automatically determined. The thresholds may be automatically determined as described above. In 402, those automatically determined thresholds are used to prune and retrain a neural network. In some embodiments, the thresholds may be automatically determined in 400 through multiple iterations. After those iterations are complete, in 402, the resulting thresholds are used to iteratively prune and retrain the neural network.

Figure 5:
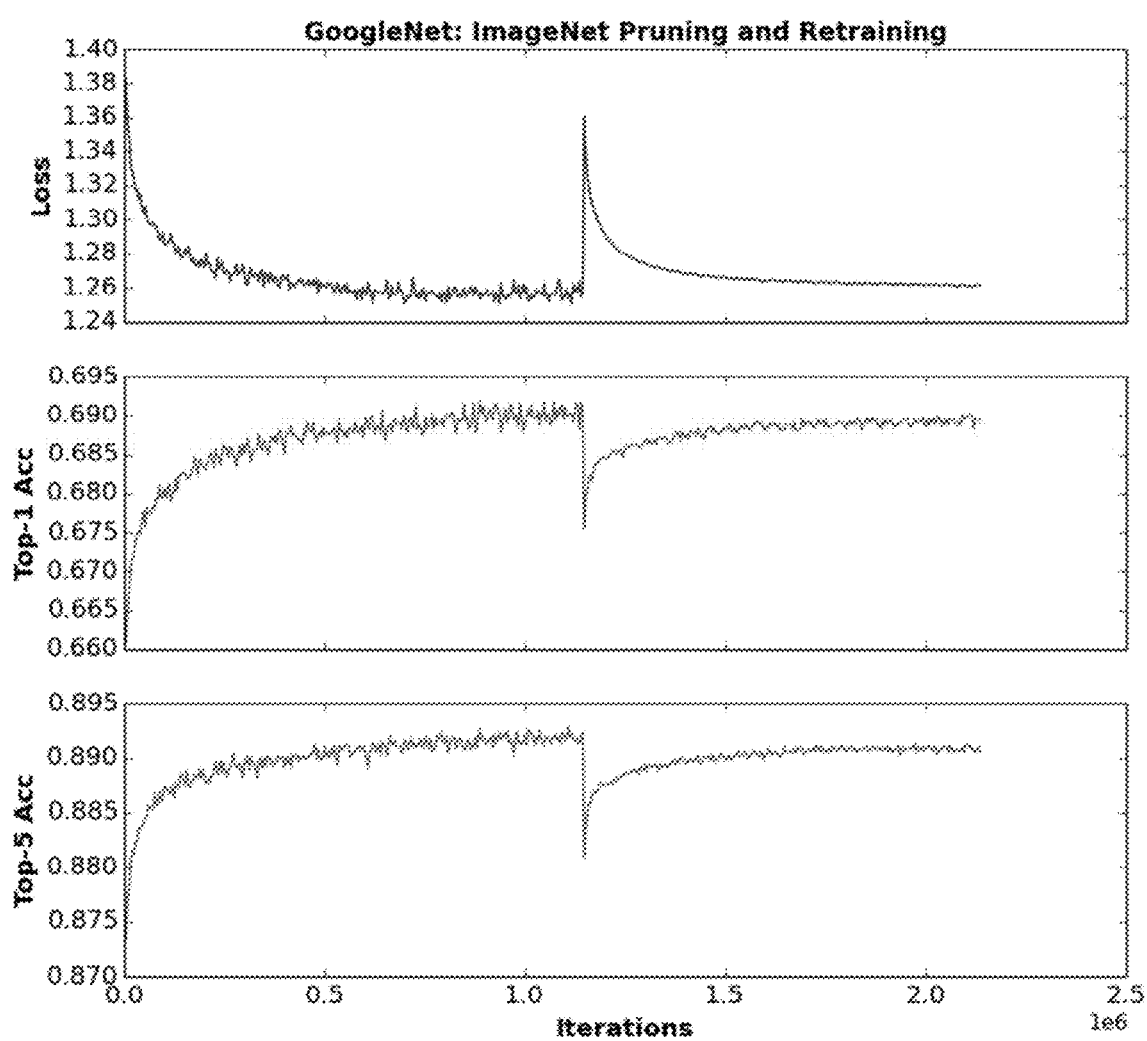
FIG. 5 is a set of graphs illustrating a retraining operation according to some embodiments.

FIG. 5 is a set of graphs illustrating a retraining operation according to some embodiments. These graphs illustrated the pruning and retraining of a GoogLeNet neural network. In particular, the graphs illustrate the change in loss, top-1 accuracy, and top-2 accuracy. Here, two pruning operations are illustrated, one before the first training iterations and a second after an amount of training iterations have been performed. Although two pruning operations are illustrated, any number of pruning operations may be performed.

FIG. 6 is a chart including results of various neural networks after pruning and retraining according to some embodiments. In particular, the change in the size of the weight parameters, the top-1 accuracy, and the top-5 accuracy are described with respect to various neural networks and pruned versions of those networks. Here, the AlexNet. VGG16, SqueezeNet, and GoogLeNet, and pruned versions of the AlexNet and VGG16 are listed. In particular, the pruned GoogLeNet entries show the training and inference networks for GoogLeNet pruned as described herein. As described, the GoogLeNet pruned as described herein has the smallest size of weight parameters for a neural network capable of delivering higher accuracy. In particular, both the pruned training and inference neural networks are able to achieve over 89% top-5 accuracy with the smallest size of weight parameters.

FIGS. 7A-C is a chart including results of various techniques of pruning neural networks according to some embodiments. These charts list the layers and sublayers of the GoogLeNet neural network and the results of various pruning techniques. Two instances of prefixed thresholds are illustrated, including the resulting total of weights and the top-1 and top-5 performance after pruning. Another instance illustrates the results of thresholds generated using empirical rules. Finally, the last instance illustrates results of pruning according to an embodiment described herein. The results show that pruning as described herein can achieve an accuracy comparable to the unpruned network with fewer weights than the prefixed thresholds. With respect to the thresholds generated by empirical rules, the pruning described herein achieved a similar or greater accuracy with a similar total of weights. However, the pruning describe herein may be performed without requiring a selection technique or rules to preselect the pruning thresholds. That is, multiple iterations with prefixed thresholds need not be performed and empirical information to generate rules may not be needed yet similar and/or better results may be achieved.

Figure 8:
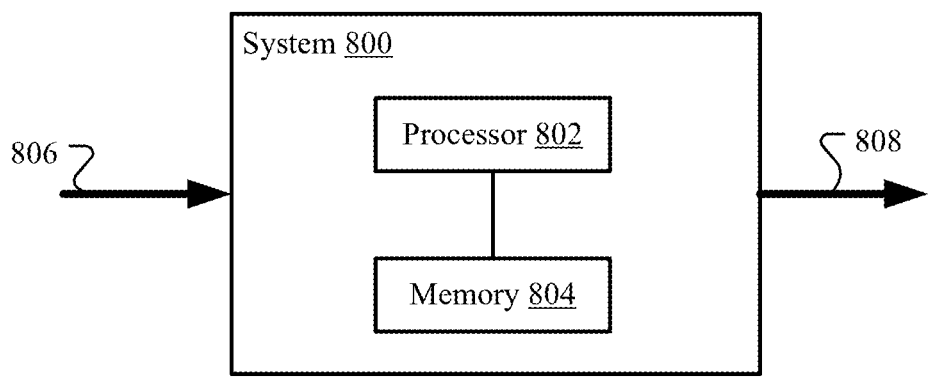
FIG. 8 is a system according to some embodiments.

FIG. 8 is a system according to some embodiments. A system 800 includes a processor 802 and a memory 804. The processor 802 may be a general purpose processor, a digital signal processor (DSP), an application specific integrated circuit, a microcontroller, a programmable logic device, discrete circuits, a combination of such devices, or the like. The processor 802 may include internal portions, such as registers, cache memory, processing cores, or the like, and may also include external interfaces, such as address and data bus interfaces, interrupt interfaces, or the like. Although only one processor 802 is illustrated in systems 800, multiple processors 802 may be present. In addition, other interface devices, such as logic chipsets, hubs, memory controllers, communication interfaces, or the like may be part of the system 800 to connect the processor 802 to internal and external components.

The memory 804 may be any device capable of storing data. Here, one memory 804 is illustrated for system 800; however, any number of memories 804 may be included in the systems 800, including different types of memories. Examples of the memories 804 include a dynamic random access memory (DRAM) module, a double data rate synchronous dynamic random access memory (DDR SDRAM) according to various standards such as DDR, DDR2, DDR3, DDR4, static random access memory (SRAM), non-volatile memory such as Flash, spin-transfer torque magentoresistive random access memory (STT-MRAM), or Phase-Change RAM, magnetic or optical media, or the like.

The memory 804 may be configure to store code that when executed on the processor 802 causes the system 800 to implement any or all of the techniques described herein. In some embodiments, the system 800 may be configured to receive inputs 806 such as a neural network, initial thresholds, initial pruning error allowances, acceptable pruning percentage ranges, or the like. The output 808 may include the automatically determined thresholds, a pruned and retrained neural network, or other resulting information described above.

Although the methods and systems have been described in accordance with particular embodiments, one of ordinary skill in the art will readily recognize that many variations to the disclosed embodiments are possible, and any variations should therefore be considered to be within the spirit and scope of the methods and systems disclosed herein. Accordingly, many modifications may be made by one of ordinary skill in the art without departing from the spirit and scope of the appended claims.

The invention claimed is:

1. A method, comprising:
   pruning a layer of a neural network using a threshold, the neural network comprising multiple layers; and
   repeating pruning of the layer of the neural network using a different threshold for each iteration of the repeated pruning until a pruning error of the layer equals a pruning error allowance for the layer, the pruning error being determined as a quantity of a length of a vector of pruned weights of the layer for a current iteration minus a vector of weights of the layer for a previous iteration divided by a quantity of a total length of a vector of initial weights of the layer minus a length of the vector of pruned weights of the layer for the current iteration.

2. The method of claim 1, further comprising for each layer of the neural network:
   initializing the pruning error allowance for the layer;
   initializing the threshold; and
   repeating, until a percentage of pruned weights to initial weights for the layer is within a range of a predetermined percentage for the layer by:
     repeating, until the pruning error reaches the pruning error allowance:
       pruning the layer of the neural network using the threshold;
       calculating the pruning error for a currently pruned layer;
       comparing the pruning error with the pruning error allowance; and
       changing the threshold in response to comparing the pruning error with the pruning error allowance;
     calculating the percentage of pruned weights of the currently pruned layer; and
     changing the pruning error allowance until a percentage of a length of a vector of remaining non-zero weights to the total length of the vector of initial weights for the layer is within a range of the predetermined percentage for the layer.

3. The method of claim 1, further comprising:
   repeating, until a percentage of pruned weights to initial weights for the layer is within a range of a predetermined percentage for the layer, the repeating of the pruning of the layer using a different pruning error allowance for at least one iteration.

4. The method of claim 3, wherein different types of layers of the neural network have different ranges for the percentage of pruned weights to initial weights.

5. The method of claim 1, wherein pruning the layer of the neural network comprises setting a weight to zero based on a magnitude of the weight being less than the threshold.

6. The method of claim 1, wherein pruning the layer of the neural network comprises setting a weight to zero based on a magnitude of the weight being less than the threshold scaled by a scale factor.

7. The method of claim 6, wherein the scale factor is a standard deviation of weights of the layer.

8. The method of claim 1, further comprising calculating the pruning error by dividing a length of a vector of pruned weight for the layer minus of a vector of original weights of the layer before pruning by a total length of the vector of original weights of the layer minus a length of a vector of pruned weights for the layer.

9. The method of claim 1, further comprising generating the different threshold by:
   increasing the threshold based on the pruning error being less than the pruning error allowance; and
   decreasing the threshold based on the pruning error being greater than the pruning error allowance.

10. The method of claim 1, further comprising performing repeating of the pruning of the layer of the neural network for each layer of the neural network.

11. The method of claim 1, further comprising iteratively pruning and retraining the neural network using the threshold after the pruning error of a currently pruned layer equals the pruning error allowance.

12. A method, comprising:
pruning one or more times a layer of a neural network using a different threshold for each iteration of pruning until a pruning error of a currently pruned layer equals a pruning error allowance for the layer, the neural network comprising multiple layers, and the pruning error being determined as a quantity of a length of a vector of pruned weights of the layer for a current iteration minus a vector of weights of the layer for a previous iteration divided by a quantity of a total length of a vector of initial weight of the layer minus a length of the vector of pruned weights of the layer for the current iteration; and
retraining the neural network using only weights remaining after pruning the one or more times.

13. The method of claim 12, wherein pruning layers of the neural network further comprises pruning a first type layer of the neural network using a different threshold for each iteration of pruning that is based on a predetermined percentage of non-zero weights to initial weights for the layer.

14. The method of claim 13, wherein pruning layers further comprising: pruning a second type layer of the neural network using a fixed value threshold for each iteration of pruning that is performed on the second type layer, the second type layer being different from the first type layer, the method further comprising:
repeating:
pruning of first type layers; and
retraining the neural network using only weights remaining after pruning first type layers of the neural network;
fixing weights of first type layers of the neural network; and
repeating:
pruning second type layers of the neural network; and
retraining the neural network using only weights remaining after pruning the second type layers of the neural network.

15. The method of claim 13, further comprising fixing weight of a second type layer of the neural network, the second type layer being different from the first type layer.

16. The method of claim 15, further comprising:
fixing weights of first type layers of the neural network; and
repeating:
pruning second type layers of the neural network; and
retraining the neural network using only weights remaining after pruning second type layers.

17. The method of claim 12, further comprising generating different thresholds before retraining the neural network.

18. The method of claim 12, further comprising adjusting a dropout rate for the retraining in response to a pruning rate of the pruning.

19. A system, comprising:
a memory; and
a processor coupled to the memory, the processor:
pruning a layer of a neural network using a threshold, the neural network comprising multiple layers; and
repeating pruning of the layer of the neural network using a different threshold for each iteration of the repeated pruning until a pruning error of a currently pruned layer equals a pruning error allowance for the layer, the pruning error being determined as a quantity of a length of a vector of pruned weights of the layer for a current iteration minus a vector of weights of the layer for a previous iteration divided by a quantity of a total length of a vector of initial weights of the layer minus a length of the vector of pruned weights of the layer for the current iteration.

20. The system of claim 19, wherein for each layer of the neural network, the processor further:
initializes the pruning error allowance for the layer;
initializes the threshold; and
repeats, until a percentage of pruned weights to initial weights for the layer is within a range of a predetermined percentage for the layer by:
repeating, until the pruning error reaches the pruning error allowance:
pruning the layer of the neural network using the threshold;
calculating the pruning error for the currently pruned layer;
comparing the pruning error with the pruning error allowance; and
changing the threshold in response to comparing the pruning error with the pruning error allowance;
calculating the percentage of pruned weights of the currently pruned layer; and
changing the pruning error allowance until a percentage of a length of remaining non-zero weights to the total length of the vector of initial weights for the layer is within a range of the predetermined percentage for the layer.

* * * * *